US008481767B2

(12) United States Patent
Geng et al.

(10) Patent No.: US 8,481,767 B2
(45) Date of Patent: *Jul. 9, 2013

(54) CATALYSTS FOR ESTERIFICATION OF EPOXIDIZED SOYATES AND METHODS OF USING SAME

(75) Inventors: Kebin Geng, Rocky River, OH (US); Roger W. Avakian, Aurora, OH (US)

(73) Assignee: PolyOne Corporation, Avon Lake, OH (US)

( * ) Notice: Subject to any disclaimer, the term of this patent is extended or adjusted under 35 U.S.C. 154(b) by 282 days.

This patent is subject to a terminal disclaimer.

(21) Appl. No.: 12/812,563

(22) PCT Filed: Jan. 19, 2009

(86) PCT No.: PCT/US2009/031366
§ 371 (c)(1),
(2), (4) Date: Jul. 12, 2010

(87) PCT Pub. No.: WO2009/094310
PCT Pub. Date: Jul. 30, 2009

(65) Prior Publication Data
US 2010/0292492 A1 Nov. 18, 2010

Related U.S. Application Data

(60) Provisional application No. 61/023,182, filed on Jan. 24, 2008.

(51) Int. Cl.
*C07D 301/00* (2006.01)
*C07D 303/12* (2006.01)

(52) U.S. Cl.
USPC .......................................... 549/539; 549/561

(58) Field of Classification Search
USPC .......................................... 549/539, 562, 561
See application file for complete search history.

(56) References Cited

U.S. PATENT DOCUMENTS

| | | | |
|---|---|---|---|
| 1,505,560 A | 8/1924 | Gruen et al. | |
| 2,625,481 A * | 1/1953 | Mattil et al. | 426/322 |
| 2,978,463 A * | 4/1961 | Kuester et al. | 549/539 |
| 3,070,608 A | 12/1962 | Kuester et al. | |
| 3,758,530 A | 9/1973 | Barsky | |
| 4,304,925 A | 12/1981 | Watanabe et al. | |
| 5,158,796 A | 10/1992 | Bernhardt et al. | |
| 5,324,846 A | 6/1994 | Hirshman et al. | |
| 5,434,279 A | 7/1995 | Wimmer | |
| 5,442,081 A | 8/1995 | Behr et al. | |
| 5,728,779 A | 3/1998 | van de Werff et al. | |
| 5,789,528 A | 8/1998 | Martl et al. | |
| 6,127,560 A | 10/2000 | Stidham et al. | |
| 6,489,496 B2 | 12/2002 | Barnhorst et al. | |
| 6,610,796 B2 | 8/2003 | Seo et al. | |
| 6,774,183 B1 | 8/2004 | Palumbo et al. | |
| 6,797,753 B2 | 9/2004 | Benecke et al. | |
| 2002/0090488 A1 | 7/2002 | Kurth et al. | |
| 2010/0324185 A1 | 12/2010 | Geng et al. | |

FOREIGN PATENT DOCUMENTS

| | | |
|---|---|---|
| EP | 0 295 534 | 12/1988 |
| EP | 0553400 A1 | 8/1993 |
| GB | 2045762 | 11/1980 |

OTHER PUBLICATIONS

Miyagowa et al., "Thermo-Physical and Impact Properties of Epoxy Containing Epoxidized Linseed Oil, 1 and 2a Anhydride-Cured Epoxy" Macromol, Mater. Eng. 2004, 289, 629-641.
Gan et al., "Epoxidized Esters of Palm Olein as Plasticizers for Poly(Vinyl Chloride)" Eur. Polym. J. vol. 3 No. 8, 1995, 719-724.
Lutz, "Epoxy Plasticizers" Handbook of PVC Formulating, Chapter 7, Edward J. Wickson, Wiley & Sons, 1993, 253-273.
"FLEXOL® Plasticizer EP-8 (Octyl Epoxytallate)" Union Carbide Corporation, Engineered Plastics and Carbon Fibers Division, 1988.
Greenspan, et al. "Epoxy Fatty Ester Plasticizers. Preparation and Properties." The Journal of the American Oil Chemists Society. vol. 33, Sep. 1956, 391-94.
Greenspan, "Epoxy Fatty Acid Ester Plasticizers." Industrial and Engineering Chemistry. Dec. 1953, 2722-26.
Park at al., "Thermal and mechanical properties of tetrafunctional epoxy resin toughened with epoxidized soybean oil" Materials Science and Engineering A 374 (2004) 109-114.
Holser, "Transesterification of epoxidized soybean oil to prepare epoxy methyl esters" Industrial Crops and Products 27 (2008) 130-132.

\* cited by examiner

*Primary Examiner* — Taylor Victor Oh
(74) *Attorney, Agent, or Firm* — John H. Hornickel

(57) ABSTRACT

A combination of catalysts is disclosed as useful to promote the transesterification reaction of an epoxidized soyate with a polyol to yield a high percentage of epoxidized soyate diester with epoxy functionality retained. The primary catalyst is a metallic hydroxide, and the secondary catalyst is a titanate. Bioderived plasticizers useful for thermoplastics and thermosets result.

17 Claims, No Drawings

CATALYSTS FOR ESTERIFICATION OF EPOXIDIZED SOYATES AND METHODS OF USING SAME

CLAIM OF PRIORITY

This application claims priority from U.S. Provisional Patent Application Ser. No. 61/023,182 and filed on Jan. 24, 2008, which is incorporated by reference.

FIELD OF THE INVENTION

This invention relates to the use of two different catalysts to promote a transesterification reaction of an epoxidized soyate with a diol to form an epoxidized soyate diester.

BACKGROUND OF THE INVENTION

Plasticizers from petroleum feedstocks and other synthetic sources have been dominant in industry since the mid-Twentieth Century following the polymerization of vinyl chloride and a need to make that polyvinyl chloride flexible. Phthalate plasticizers have been most prevalent.

Plasticizers from biological, renewable sources have been explored in recent years because of concerns about availability of petroleum feedstocks, cost, and asserted health concerns.

U.S. Pat. No. 6,797,753 (Benecke et al.) teaches the manufacture of a number of epoxidized diesters from fatty acids, including epoxidized propylene glycol disoyate. The method used by Benecke et al. begins with an esterification reaction followed by an epoxidation. This is a complicated reaction route, because of the use of strong oxidants during epoxidation and the generation of waste streams following epoxidation that require environmental attention.

SUMMARY OF THE INVENTION

What the art needs is a method of manufacturing epoxidized soyate diesters from naturally occurring, renewable feedstocks in a manner which retains the highly reactive epoxy moieties of the resulting diester.

The method of manufacture by Benecke et al. involving epoxidation after esterification has not been found to be suitable for small scale customized synthesis of plasticizers, which needs to avoid the establishment of a large scale reaction facility equipped to deal with strong oxidants as reagents and an environmentally complicated waste streams.

The present invention solves the problem in the art by starting with an epoxidized soyate and promoting a transesterification reaction via the use of a combination of catalysts which results in an excellent retention of intact epoxy groups on the resulting epoxidized soyate diester.

Beginning with a commercially available epoxidized soyate, made at a large facility dedicated to handle the oxidants and waste streams mentioned above, one can then proceed to a transesterification reaction at a much less complicated facility, perhaps even one associated with chemical compounds that are made with the resulting epoxidized soyate diester.

One aspect of the present invention is a catalyst system for promotion of reaction of an epoxidized soyate with a polyol to make an epoxidized soyate diester, comprising: (a) a primary catalyst comprising a metallic hydroxide and (b) a secondary catalyst comprising a titanate.

Optionally but preferably, the primary catalyst also comprises a monool as a solvent for the metallic hydroxide if the latter is in solid form.

Another aspect of the present invention is a method of using the catalyst system described above, comprising the steps of (a) mixing epoxidized soyate with a polyol and the primary catalyst and (b) introducing into the mixture of step (a) the secondary catalyst to make an epoxidized soyate diester.

Surprisingly, the efficiency of the reaction can be as high as 96% and the yield of desired diester can be as high as 80%.

Also unexpectedly, use of only metallic hydroxide yields only 42% of desired diester, whereas use of only the titanate yields a miniscule 4% of diester.

It is an advantage of the present invention that the combination of catalysts, with the metallic hydroxide serving as the primary catalyst and the titanate serving as the secondary catalyst results, unexpectedly, in a high-yielding epoxidized soyate diester with the epoxy groups of the plasticizer molecule remain intact. The epoxy groups survive the transesterification reaction, which is unexpected when compared to the disclosure of Benecke et al. which requires epoxidation to follow esterification.

Other features and advantages of the invention will be explained below.

EMBODIMENTS OF THE INVENTION

Reactants

Epoxidized Soyates

Any bioderived epoxidized soyate is a suitable candidate for use in the present invention. It is understood that "soyate" is a carboxylate moiety which refers to any naturally occurring or subsequently refined mixture of fatty acids and their esters, where the fatty acids include stearic acid, oleic acid, linoleic acid, linolenic acid, and the like. Epoxidation of such fatty acid esters, such as methyl soyate, typically generates an epoxy group, also called a glycidyl group or oxirane ring, replacing a double bond in the fatty acid backbone.

Often, the bioderived feedstock to making bioderived epoxidized soyates is epoxidized soybean oil (ESO), a known commercial commodity from biological origin. Several of its possible monoesters are also commercially available. Non-limiting examples of epoxidized soyates include epoxidized methyl soyate, epoxidized ethyl soyate, epoxidized butyl soyate, epoxidized octyl soyate, and combinations thereof. Of these epoxidized methyl soyate (CAS No. 68082-35-9) is preferred because the transesterification reaction with a polyol favors the methyl soyate over longer hydrocarbon chain ester molecules.

The epoxidized soyate can be commercially purchased or made from the reaction of epoxidized soybean oil with an alcohol such as methanol in the presence of a metallic hydroxide as a catalyst at a temperature of between 23° C.-45° C. and a 1 atmosphere (ambient) pressure and 50% relative humidity for approximately 36 hours using a round bottom flask reaction vessel. Another description of the synthesis of epoxidized methyl soyate can be found in Miyagowa et al., "Thermo-Physical and Impact Properties of Epoxy Containing Epoxidized Linseed Oil, 1 Anhydride-Cured Epoxy" *Macromol. Mater. Eng.* 2004, 289, 629-635.

A commercial source of epoxidized soyates is the Vikoflex® 7010 brand epoxidized methyl soyate from Arkema of Philadelphia, Pa.

Epoxidized soyate, to be useful in the present invention, should have from about 0.5 to about 4, and preferably from about 1 to about 2 percentage epoxy groups in the molecule. This amount is the starting point and the ideal completion point of epoxy content in the resulting epoxidized soyate diester. Therefore, whether purchasing from commercial sources or making a precursor, the epoxy groups are important to the completion of a successful reaction in the presence of the catalysts.

Polyol

Any bioderived polyol is a suitable candidate for use in the present invention. Non-limiting examples of polyols are propanediols, butane diols, hexane diols, and combinations thereof. Diols are preferred because they generally exhibit better permanence, better plasticizing ability, and less volatility with polyvinyl halides than other polyols. Of preferred diols, propylene glycols also known as propanediols, are most preferred, because of a balance of cost vs. performance.

The density of epoxy groups per molecule of the resulting epoxidized soyate diester can also be a factor in the selection of polyol. The reaction of a polyol with two of the same or different epoxidized soyates creates an A-B-A/C structure, where A/C denotes that the polyol B reacts with either another A soyate or a different C soyate. All other things being constant, the length of the carbon chain of the polyol will affect the density of the epoxy groups per molecule.

To demonstrate the effectiveness of the method of the present invention, 1,3 propanediol (CAS No. 504-63-2) was used.

A commercial source of 1,3 propanediol is Fluka brand propanediol from Aldrich Chemicals.

Catalysts

Primary Catalyst

Any metallic hydroxide is a suitable candidate for use as a primary catalyst in the present invention. Non-limiting examples of metallic hydroxides include alkali and alkaline earth metal hydroxides. Of those, sodium, potassium, calcium, and magnesium hydroxide are most common, and potassium hydroxide is more preferred as the primary catalyst for this reaction because of its higher solubility and catalytic activity than other metallic hydroxides.

Potassium hydroxide is a commodity chemical available from any number of sources, include Sigma-Aldrich. If obtained in the form of flakes, methanol can be used to dissolve the flakes prior to introduction into the reaction vessel. Of all metallic hydroxides, potassium hydroxide has the highest solubility into methanol.

Dilution of KOH flakes into methanol can generate a solution ranging from about 1 to about 30, and preferably from about 10 to about 15 percent KOH in methanol.

Secondary Catalyst

Any titanium catalyst is a candidate as the secondary catalyst in the present invention. Non-limiting examples of titanium-based catalysts include such as 2-ethylhexyl titanate, tetraisopropyl titanate, tetrabutyl titanate, tetrakis-2-ethylhexyl titanate, and combinations thereof. Of these candidates, tetrakis-2-ethylhexyl titanate (CAS No. 1070-10-6) is preferred because of its balance of catalytic activity and robustness against the effects of hydrolysis in the presence of atmospheric moisture which leads to inactivity.

Experiments thus far have shown that while more simply structured titanates such as tetraisopropyl titanate can catalyze the reaction to generate minor diester yields, with more work to be done toward optimization of reaction, the more complicated structured titanates such as tetrakis-2-ethylhexyl titanate are already capable of producing commercially practical yields. Therefore, one of ordinary skill in the art without undue experimentation can select from various titanates, or combinations of them, for use as the secondary catalyst in the present invention.

Table 1 shows acceptable, desirable, and preferred ranges of the reactants and catalysts and optional solvent, expressed in moles.

TABLE 1

| Ingredient | Ingredients (Moles) | | |
|---|---|---|---|
| | Acceptable | Desirable | Preferred |
| Epoxidized soyate | 1.0 | 1.0 | 1.0 |
| Polyol | 0.2-0.5 | 0.35-0.45 | 0.40-0.45 |
| Metallic hydroxide | 0.01-0.02 | 0.01-0.02 | 0.01-0.02 |

TABLE 1-continued

| Ingredient | Ingredients (Moles) | | |
|---|---|---|---|
| | Acceptable | Desirable | Preferred |
| Titanate | 0.007-0.015 | 0.007-0.015 | 0.007-0.015 |
| Optional alcohol solvent | 0-0.22 | 0-0.22 | 0-0.22 |

Processing

The preparation of the epoxidized soyate diesters in the presence of the catalysts occurs in a magnetically stirred reaction vessel heated to a temperature from about 60° C. to about 80° C., and preferably from about 65° C. to about 75° C. for about 18-22 hours while undergoing vigorous mixing using the magnetic stirrer. Nitrogen protection is also required because of the titanate catalyst.

The order of addition of the ingredients begins with the two reactants and the primary catalyst, stirring for approximately 30 minutes under a nitrogen atmosphere, followed by the addition of the secondary catalyst and further stirring under a nitrogen atmosphere for several hours.

A very viscous liquid is the reaction product, as one would hope for a epoxidized soyate diester to be useful as a plasticizer. The liquid can solidify if left to rest overnight.

The reaction vessel can be as conventional as laboratory glassware such as a beaker with a magnetic stirrer on a mixing hotplate to as specialized as a three-necked round-bottom flask with a mechanical stirrer on a heating mantle or commercially scaled equivalents thereof. Scale-up from lab bench reaction to commercial production is a process not unfamiliar to those of ordinary skill in the art without undue experimentation being required. Scale-up can move from batch processing to continuous processing.

USEFULNESS OF THE INVENTION

The usefulness of the combination of catalysts is apparent from the ability to produce epoxidized soyate diesters with intact epoxy groups and a yield of diesters as high as 80% with a residual epoxidized soyate content of under 5%. This achievement is truly unexpected in the art because (a) epoxy groups are unlikely to survive transesterification reactions under forcing conditions which typically uses strong bases to achieve a high conversion rate, thereby attacking the epoxy group and (b) transesterification from a mono-soyate to a disoyate is unlikely to yield over 50% of disoyate because transesterification is an equilibrium reaction between reactants, the mono-soyate, and the disoyate, especially at the molar ratios identified in Table 1 above.

Neither catalyst alone can achieve such results, as the Examples below report.

Usefulness of an epoxidized soyate diester with intact epoxy groups is first and foremost as a bioderived plasticizer for any rigid thermoplastic or thermoset matrix which needs to be made more flexible. Any conventional use of any phthalate plasticizer today is a candidate use for epoxidized soyate diesters made using the method of the present invention, relying on the combination of catalysts of the present invention.

Plasticizers are most often used with such rigid thermoplastics as polyvinyl chloride to produce solid but flexible polyvinyl chloride compounds or to produce viscous liquid plastisols of polyvinyl chloride dispersed resins.

Presently preferred as a bioderived plasticizer is epoxidized propanediol disoyate arising from the reaction according to the present invention of epoxidized methyl soyate and propanediol.

EXAMPLES

Comparative Examples A and B and Examples 1-3

Table 2 shows the ingredients and their sources. Table 3 shows the recipes, preparation, and resulting properties.

Size exclusion chromatography (SEC) was used to determine the amounts of residual epoxidized methyl soyate, the yield of monoester, and the yield of diester. Carbon nuclear magnetic resonance (13C-NMR) spectroscopy was used to determine the intact nature of the epoxy groups after reaction.

TABLE 2

Ingredients

| Ingredient Name | Commercial Source | Other Info. |
|---|---|---|
| Epoxidized Methyl Soyate ("Lab EMS") Soyate Reactant | Lab-made according to the process described above in Paragraph [00020] | |
| Epoxidized Methyl Soyate ("Vikoflex EMS") Soyate Reactant | Vikoflex ® 7010 from Arkema of Philadelphia, PA | CAS# 68082-35-9; LOT# ASCAP101V |
| 1,3-propanediol ("1,3-diol") Polyol Reactant | Fluka ® 1,3-diol from Aldrich of Milwaukee, WI | CAS# 504-63-2; ≧99% (GC) |
| Potassium hydroxide (KOH) Primary Catalyst | Aldrich | Flakes needing MeOH |
| Tetrakis(2-ethylhexyl) orthotitanate ("Titanate") Secondary Catalyst | TYZOR ® TOT from DuPont of Wilmington, DE | CAS# 1070-10-6; LOT# 304; 95%~99% |
| Methanol ("MeOH") solvent for KOH | Fisher Scientific of Pittsburgh, PA | CAS# 67-56-1; LOT# 072825; 99.9% |

TABLE 3

Recipes, Preparation, and Properties

| Ingredient Name (Amounts in moles) | Comparative Example A | Comparative Example B | Example 1 | Example 2 | Example 3 |
|---|---|---|---|---|---|
| Lab EMS | 1.0 | 1.0 | 1.0 | 1.0 | |
| Vikoflex ® 7010 EMS | | | | | 1.0 |
| 1,3-diol | 0.4218 | 0.4218 | 0.4219 | 0.4304 | 0.4270 |
| KOH | 0.01693 | | 0.0185 | 0.0195 | 0.0211 |
| Titanate | | 0.0090 | 0.0073 | 0.0091 | 0.0149 |
| MeOH | 0.1743 | | 0.1906 | 0.2010 | 0.2173 |
| Mixing Equipment | Magnetically stirred on a 25 ml round-bottom flask on a Corning Stirrer/Hot Plate | | | | |
| Mixing Temp. | 65° C. | 65° C. | 65° C. | 75° C. | 65° C. |
| Mixing Duration | 20 hours | | | | |
| Mixing Speed | Setting the Corning Stirrer/Hot Plate (6" × 5") at "8" (stirring vigorously) | | | | |
| N₂ Protection | No | Yes | Yes | Yes | Yes |
| Order of Addition of Ingredients | EMS + 1,3-diol, then KOH/MeOH | EMS + 1,3-diol, then Titanate | EMS + 1,3-diol, then KOH/MeOH, lastly adding Titanate after stirring 30 min under N₂. | | |
| Form of Product After Mixing | Viscous liquid | Low viscous liquid | Very viscous liquid, becomes solid after sitting overnight | | |
| Residual EMS, % | 32.5 | 88.9 | 14.5 | 4.1 | 19.1 |
| Monoester Yield (%) | 22.1 | 5.3 | 6.6 | 2.3 | 16.4 |
| Diester Yield (%) | 41.7 | 4.2 | 72.3 | 80.8 | 58.6 |
| Intact Epoxy Groups | Yes, with observation of 13C-NMR graphs showing nearly all starting epoxy groups are retained. | | | | |

The comparison of diester yields shows the considerable value of the present invention. Only both KOH and Titanate as a combined catalyst system yields acceptable percentages of diester. The ratio of Diester to Monoester yield was excellent for Example 1 and unexpectedly spectacular for Example 2. The miniscule residual epoxidized soyate of Example 2 combined with the diester yield of 80% was totally unexpected. The reaction at 75° C. contributed to this result.

The invention is not limited to the above embodiments. The claims follow.

What is claimed is:

1. A method comprising the steps of:
   (a) mixing epoxidized soyate with a polyol and a primary catalyst and
   (b) introducing into the mixture of step (a) a secondary catalyst to make an epoxidized soyate diester;
   wherein the primary catalyst comprises a metallic hydroxide and wherein the secondary catalyst comprises a titanate.

2. The method of claim 1, wherein the epoxidized soyate is selected from the group consisting of epoxidized methyl soyate, epoxidized ethyl soyate, epoxidized butyl soyate, epoxidized octyl soyate, and combinations thereof.

3. The method of claim 1, wherein the epoxidized soyate has from about 0.5 to about 4 epoxy groups per molecule.

4. The method of claim 1, wherein the polyol is selected from the group consisting of propanediols, butane diols, hexane diols, and combinations thereof.

5. The method of claim 1, wherein the epoxidized soyate is epoxidized methyl soyate and the polyol is propanediol and wherein the resulting product of reaction is epoxidized propanediol disoyate.

6. The method of claim 1, wherein the molar ratio of the polyol, the metallic hydroxide, the titanate, and the optional alcohol solvent relative to the epoxidized soyate ranges according to the following table:

| | |
|---|---|
| Epoxidized soyate | 1.0 |
| Polyol | 0.2-0.5 |
| Metallic hydroxide | 0.01-0.02 |
| Titanate | 0.007-0.015 |
| Optional alcohol solvent | 0-0.22. |

7. The method of claim 2, wherein the epoxidized soyate has from about 0.5 to about 4 epoxy groups per molecule.

8. The method of claim 7, wherein the polyol is selected from the group consisting of propanediols, butane diols, hexane diols, and combinations thereof.

9. The method of claim 7, wherein the epoxidized soyate is epoxidized methyl soyate and the polyol is propanediol and wherein the resulting product of reaction is epoxidized propanediol disoyate.

10. The method of claim 7, wherein the molar ratio of the polyol, the metallic hydroxide, the titanate, and the optional alcohol solvent relative to the epoxidized soyate ranges according to the following table:
Epoxidized soyate 1.0
Polyol 0.2-0.5
Metallic hydroxide 0.01-0.02
Titanate 0.007-0.015
Optional alcohol solvent 0-0.22.

11. The method of claim 1, wherein the metallic hydroxide is an alkali metal hydroxide or an alkaline metal earth hydroxide.

12. The method of claim 11, wherein the metallic hydroxide is potassium hydroxide.

13. The method of claim 1, wherein the primary catalyst is a metallic hydroxide flake dissolved in alcohol for further processing.

14. The method of claim 12, wherein the secondary catalyst is selected from the group consisting of 2-ethylhexyl titanate, tetraisopropyl titanate, tetrabutyl titanate, tetrakis-2-ethylhexyl titanate, and combinations thereof.

15. The method of claim 12, wherein the secondary catalyst is tetrakis-2-ethylhexyl titanate.

16. The method of claim 13, wherein the molar ratio of the polyol, the metallic hydroxide, the titanate, and the optional alcohol solvent relative to the epoxidized soyate ranges according to the following table:
Epoxidized soyate 1.0
Polyol 0.35-0.45
Metallic hydroxide 0.01-0.02
Titanate 0.007-0.015
Optional alcohol solvent 0-0.22.

17. The method of claim 12, wherein the molar ratio of the polyol, the metallic hydroxide, the titanate, and the optional alcohol solvent relative to the epoxidized soyate ranges according to the following table:

| | |
|---|---|
| Epoxidized soyate | 1.0 |
| Polyol | 0.2-0.5 |
| Metallic hydroxide | 0.01-0.02 |
| Titanate | 0.007-0.015 |
| Optional alcohol solvent | 0-0.22. |

* * * * *

UNITED STATES PATENT AND TRADEMARK OFFICE
CERTIFICATE OF CORRECTION

PATENT NO.       : 8,481,767 B2
APPLICATION NO.  : 12/812563
DATED            : July 9, 2013
INVENTOR(S)      : Kebin Geng et al.

It is certified that error appears in the above-identified patent and that said Letters Patent is hereby corrected as shown below:

In the Claims

Column 8, line 20, "Polyol 0.2-0.5" should be changed to -- Polyol 0.35-0.45 --

Signed and Sealed this
Fifth Day of November, 2013

Teresa Stanek Rea
*Deputy Director of the United States Patent and Trademark Office*